US011354634B2

(12) United States Patent
England et al.

(10) Patent No.: US 11,354,634 B2
(45) Date of Patent: Jun. 7, 2022

(54) SYSTEM FOR LAYERED DIGITAL RESOURCE DISTRIBUTION IN AN ELECTRONIC NETWORK ENVIRONMENT

(71) Applicant: Bank of America Corporation, Charlotte, NC (US)

(72) Inventors: Tony England, Tega Cay, SC (US); Steven Michael Twombly, Saco, ME (US); Kristin Hodge Wallace, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 10 days.

(21) Appl. No.: 16/732,497

(22) Filed: Jan. 2, 2020

(65) Prior Publication Data

US 2021/0209570 A1 Jul. 8, 2021

(51) Int. Cl.
*G06Q 20/10* (2012.01)
*G06Q 20/12* (2012.01)
*H04L 47/783* (2022.01)
*G06Q 20/38* (2012.01)

(52) U.S. Cl.
CPC .......... *G06Q 20/123* (2013.01); *G06Q 20/10* (2013.01); *G06Q 20/3821* (2013.01); *H04L 47/783* (2013.01)

(58) Field of Classification Search
CPC ... G06Q 20/10; G06Q 20/123; G06Q 20/3821
See application file for complete search history.

(56) References Cited

U.S. PATENT DOCUMENTS

| 8,433,288 | B2 | 4/2013 | Frew et al. |
| 8,620,790 | B2 | 12/2013 | Priebatsch |
| 8,752,154 | B2 | 6/2014 | Kelley |
| 9,009,805 | B1 | 4/2015 | Kirkby et al. |
| 9,078,128 | B2 | 7/2015 | Medina et al. |
| 9,542,688 | B2 | 1/2017 | Bernard et al. |
| 9,645,966 | B2 | 5/2017 | Santamaria et al. |
| 10,102,515 | B2 | 10/2018 | Vastenavondt et al. |
| 10,552,822 | B2 | 2/2020 | Caglayan et al. |
| 10,685,301 | B2 | 6/2020 | Smith et al. |
| 2004/0024688 | A1* | 2/2004 | Bi .......................... G06Q 40/04 705/37 |

(Continued)

*Primary Examiner* — Arunava Chakravarti
(74) *Attorney, Agent, or Firm* — Moore & Van Allen PLLC; Anup Shrinivasan Iyer (57) ABSTRACT

Systems, computer program products, and methods are described herein for layered digital resource distribution in an electronic network environment. The present invention is configured to electronically receive computing instructions from a computing device associated with a first entity comprising a first request to execute a resource transfer with a second entity; determine a primary digital resource associated with the first entity; generate a first digital resource specifically to execute the resource transfer with the second entity, wherein the first digital resource is associated with the primary digital resource, wherein the first digital resource is electronically linked to the primary digital resource; initiate the execution of the first request of the resource transfer with the second entity using the first digital resource; and store the first digital resource in a digital repository associated with the primary digital resource.

20 Claims, 4 Drawing Sheets

(56) References Cited

U.S. PATENT DOCUMENTS

| | | | |
|---|---|---|---|
| 2007/0011602 A1* | 1/2007 | Anandpura | H04N 21/43637 715/210 |
| 2009/0106556 A1* | 4/2009 | Hamid | H04L 63/18 713/176 |
| 2014/0136419 A1 | 5/2014 | Kiyohara | |
| 2015/0199679 A1 | 7/2015 | Palanisamy et al. | |
| 2015/0254656 A1 | 9/2015 | Bondesen et al. | |
| 2015/0254664 A1 | 9/2015 | Bondesen et al. | |
| 2015/0269566 A1 | 9/2015 | Gaddam et al. | |
| 2016/0307196 A1 | 10/2016 | Achhra et al. | |
| 2017/0262841 A1 | 9/2017 | Good et al. | |
| 2017/0300961 A1 | 10/2017 | Khvostov et al. | |
| 2018/0336553 A1 | 11/2018 | Brudnicki et al. | |

* cited by examiner

SYSTEM FOR LAYERED DIGITAL RESOURCE DISTRIBUTION IN AN ELECTRONIC NETWORK ENVIRONMENT

FIELD OF THE INVENTION

The present invention embraces a system for layered digital resource distribution in an electronic network environment.

BACKGROUND

Resource relationship hierarchy allows for resource control instructions to flow from one digital resource to another, while allowing them to remain separate digital entities. Therefore, there is a need for a layered digital resource distribution in an electronic network environment.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for layered digital resource distribution in an electronic network environment is presented. The system comprising: at least one non-transitory storage device; and at least one processing device coupled to the at least one non-transitory storage device, wherein the at least one processing device is configured to: electronically receive computing instructions from a computing device associated with a first entity comprising a first request to execute a resource transfer with a second entity; determine a primary digital resource associated with the first entity, wherein the primary digital resource is electronically linked to an electronic payment instrument associated with the first entity; generate a first digital resource specifically to execute the resource transfer with the second entity, wherein the first digital resource is associated with the primary digital resource, wherein the first digital resource is specifically generated to execute the resource transfer with the second entity, wherein the first digital resource is electronically linked to the primary digital resource; initiate the execution of the first request of the resource transfer with the second entity using the first digital resource; and store the first digital resource in a digital repository associated with the primary digital resource.

In some embodiments, the at least one processing device is further configured to: electronically receive computing instructions from a computing device associated with the first entity comprising a second request to execute of a resource transfer with the second entity; determine the primary digital resource associated with the first entity; electronically retrieve from the digital repository associated with the primary digital resource, the first digital resource specifically generated to execute the resource transfer with the second entity; and initiate the execution of the second request of the resource transfer with the second entity using the first digital resource.

In some embodiments, the at least one processing device is further configured to: electronically receive computing instructions from the computing device associated with the first entity to retrieve one or more secondary digital resources associated with the primary digital resource; and transmit control signals configured to cause the computing device associated with the first entity to display a first user interface, wherein the first user interface comprises the one or more secondary digital resources associated with the primary digital resource, wherein the one or more secondary digital resources comprises at least the first digital resource.

In some embodiments, the at least one processing device is further configured to: transmit control signals configured to cause the computing device associated with the first entity to display an authentication interface, wherein the authentication interface comprises one or more input fields configured to receive one or more authentication credentials from the first entity; electronically receive, via the authentication interface, the one or more authentication credentials from the first entity; verify the one or more authentication credentials associated with the first entity; and transmit control signals configured to cause the computing device associated with the first entity to display the first user interface based on at least verifying the one or more authentication credentials.

In some embodiments, the at least one processing device is further configured to: electronically receive, via the first user interface, computing instructions from the computing device associated with the first entity to execute an action on the primary digital resource, wherein the action comprises at least deleting the primary digital resource, modifying the primary digital resource, and/or replacing the primary digital resource; determine the one or more secondary digital resources associated with the primary digital resource; generate an alert in response to electronically receiving the computing instructions to execute the action the primary digital resource; and transmit control signals configured to cause the computing device associated with the first entity to display an alert interface, wherein the alert interface comprises one or more corresponding effects the execution of the action on the primary digital resource will have on the one or more secondary digital resources.

In some embodiments, the at least one processing device is further configured to: electronically receive, via the alert interface, computing instructions from the computing device associated with the first entity to delete the primary digital resource; transform the one or more secondary digital resources into one or more primary digital resources; delete the primary digital resource; and replace the primary digital resource with the one or more transformed secondary digital resources.

In some embodiments, the at least one processing device is further configured to transform the one or more secondary digital resources into the one or more primary digital resources, wherein transforming further comprises: severing a link between the primary digital resource and the one or more secondary resources; and generating a link between the one or more secondary digital resources and the electronic payment instrument associated with the first entity.

In another aspect, a computer-implemented method for layered digital resource distribution in an electronic network environment is presented. The method comprising: electronically receiving computing instructions from a computing device associated with a first entity comprising a first request to execute a resource transfer with a second entity; determining a primary digital resource associated with the first entity, wherein the primary digital resource is electronically linked to an electronic payment instrument associated with the first entity; generating a first digital resource specifically to execute the resource transfer with the second entity, wherein the first digital resource is associated with the primary digital resource, wherein the first digital resource is specifically generated to execute the resource transfer with the second entity, wherein the first digital resource is electronically linked to the primary digital resource; initiating the execution of the first request of the resource transfer with the second entity using the first digital resource; and storing the first digital resource in a digital repository associated with the primary digital resource.

In yet another aspect, a computer program product for layered digital resource distribution in an electronic network environment is presented. The computer program product comprising a non-transitory computer-readable medium comprising code causing a first apparatus to: electronically receive computing instructions from a computing device associated with a first entity comprising a first request to execute a resource transfer with a second entity; determine a primary digital resource associated with the first entity, wherein the primary digital resource is electronically linked to an electronic payment instrument associated with the first entity; generate a first digital resource specifically to execute the resource transfer with the second entity, wherein the first digital resource is associated with the primary digital resource, wherein the first digital resource is specifically generated to execute the resource transfer with the second entity, wherein the first digital resource is electronically linked to the primary digital resource; initiate the execution of the first request of the resource transfer with the second entity using the first digital resource; and store the first digital resource in a digital repository associated with the primary digital resource.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, individual, group, association, financial institution, establishment, company, union, merchant, authority or the like, employing information technology resources for processing large amounts of data and/or involved in providing goods and/or services to other users and/or entities.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual who has a relationship with the entity, such as a customer or a prospective customer. In other embodiments, a user may be one or more entities capable of executing a resource transfer with one or more other entities.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve modules created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, a "resource transfer" or "transfer of resources" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. In some embodiments, the user may authorize a resource transfer using at least a payment instrument (credit cards, debit cards, checks, digital wallets, currency, loyalty points), and/or payment credentials (account numbers, payment instrument identifiers). A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "digital resource" may refer to a non-sensitive data element such as a token. The token may be a reference (i.e., identifier) that maps back to a sensitive data element, such as an electronic payment instrument, through a tokenization system. The mapping from the electronic payment instrument to a digital resource may use algorithms which render digital resources infeasible to reverse in the absence of the tokenization system. By way of an example, the tokenization system may include randomizing the sensitive data elements in such a way that the sensitive data elements do not have an intrinsic value of its own. In some embodiments, the digital resource may be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

Figure 1:
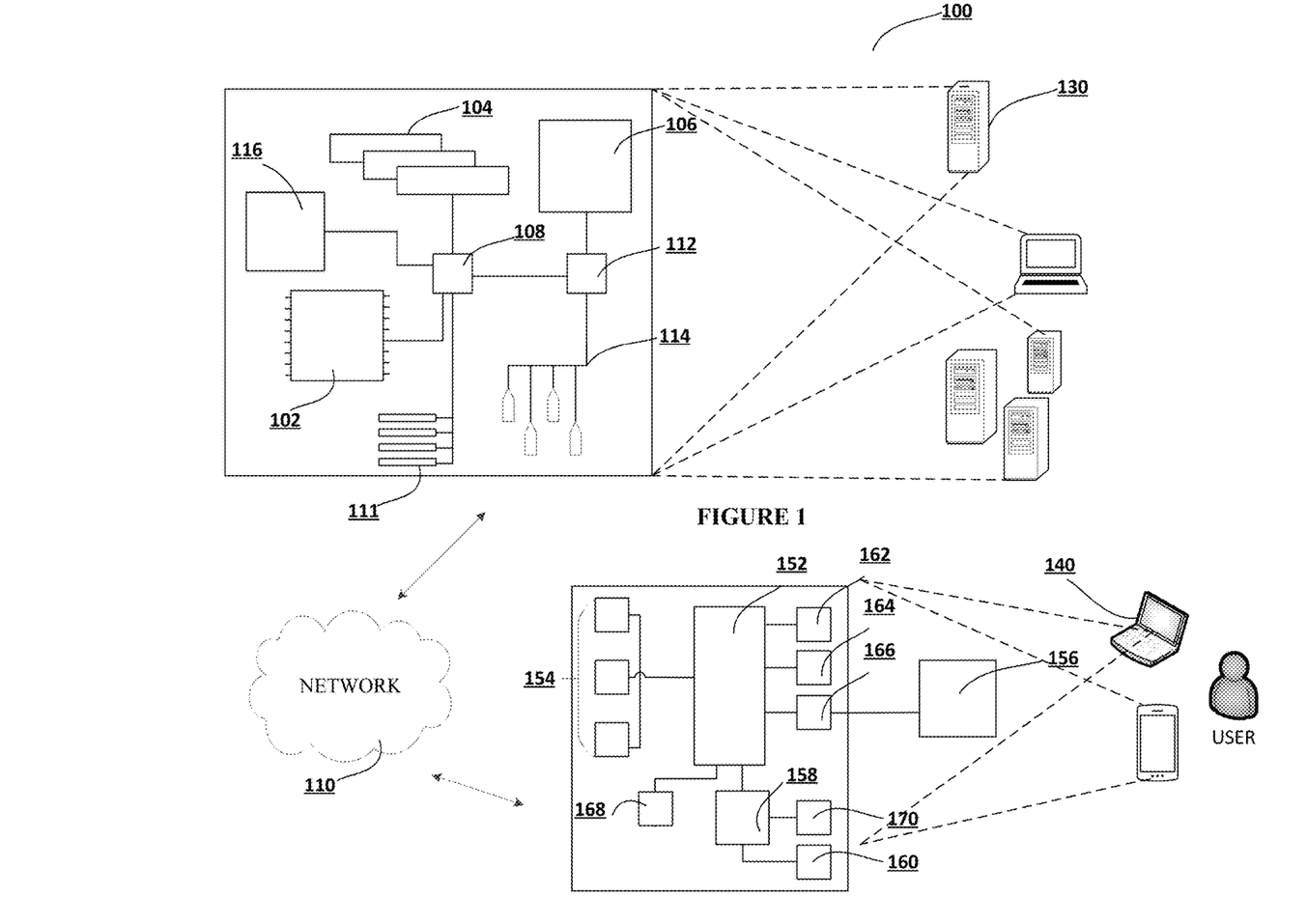
FIG. 1 illustrates technical components of a system for layered digital resource distribution in an electronic network environment, in accordance with an embodiment of the invention.

FIG. 1 presents an exemplary block diagram of the system environment for layered digital resource distribution in an electronic network environment 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information.

Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Entities typically employ a comprehensive data security plan as part of their overall technology framework to maintain security at all levels—from the database and storage system to the network, compute and other supporting tools. Most entities provide a security policy framework of integrated technology and keeps information in a central repository with automated mandatory access controls. With the entity-consumer relationship swiftly becoming digital, entities are transforming the way they operate to meet the ever-changing needs of their customers and the increasing use of mobile phones and devices. As part of this digital relationship, to facilitate a transfer of resources, entities implement a mobile wallet—a virtual wallet that stores information associated with a payment instrument on a mobile computing device. Instead of storing the information associated with the payment instrument in the mobile wallet, entities implement a tokenization system to generate a digital resource (e.g., an alias, substitute, surrogate, or other like identifier) to replace the sensitive data in the payment instrument (such as credit card numbers) with unique identification symbols that retain all the essential information about the payment instrument without compromising its security. These digital resources or portions of digital resources may be used as a stand in for a user account number, username, pin number, routing information related to the financial institution associated with the payment instrument, security code, or other like information relating to the user account. The digital resources may then be utilized as a payment instrument to complete a transfer of resources. In some embodiments, the payment instrument may include any other information that may be used to access resources from one or more financial institution accounts of the user, for example, a debit card, credit card, checkcard, ATM card, paper check, electronic check, wire transfer, cash, online bill pay, automated clearing house (ACH), wireless and/or contactless payment, and/or the like.

In some embodiments, instead of paying with cash, check, or credit cards, the user can use the mobile computing device with the digital resource stored therein to pay for a wide range of services and digital or hard goods. Of the various models used in mobile payment, Near Field Communication (NFC) is used mostly in paying for purchases made in physical stores or transportation services. A user using a mobile computing device equipped with the smartcard may waive his/her phone near a reader module to execute the transaction after which a payment could be deducted from an associated financial institution account directly. In some embodiments, the user can use the digital resource to execute a transfer of resources via electronic commerce which allows users to directly purchase goods and/or services from a merchant and/or service provider over the Internet using a web browser.

For recurring transfer of resources with a particular merchant, the system of the present invention may be configured to generate a secondary digital resource specific to the merchant, and link the secondary digital resource to the primary digital resource stored in the mobile computing device of the user. Each time the recurring transfer of resources is executed with the merchant, the secondary digital resource generated specifically for the merchant is triggered and the transaction is executed using the secondary digital resource. However, any action executed on the primary digital resource may affect the secondary digital resources linked to it. For example, if the user upgrades the mobile computing device with the primary digital resource stored therein, any secondary digital resource electronically linked to the primary digital resource will be affected by the upgrade. This is due to the fact that the primary digital resource is tied to the mobile computing device's hardware security module. A hardware security module (HSM) may be a dedicated crypto processor that is specifically designed for the protection of the crypto key lifecycle. Hardware security modules act as trust anchors that protect the cryptographic infrastructure of the mobile computing device. In such situations, the user will have to create a new primary digital resource for the upgrade mobile computing device and re-link each secondary digital resource to the newly created primary resource. In another example, if the user deletes the primary digital resource from the mobile computing device, any secondary digital resources electronically linked to the primary digital resource may automatically be deleted. Accordingly, the system of the present invention may be configured to generate an alert when any action executed on the primary digital resource affects any of the secondary digital resources electronically linked to the primary digital resource. In cases where the user deletes the primary digital resource, the system of the present invention may be configured to transform the secondary digital resources into primary digital resources and link them directly to the hardware security module of the mobile computing device. In this way, even if the primary digital resource is deleted inadvertently, any recurring transaction executed by the linked secondary digital resource are not affected.

Figure 2:
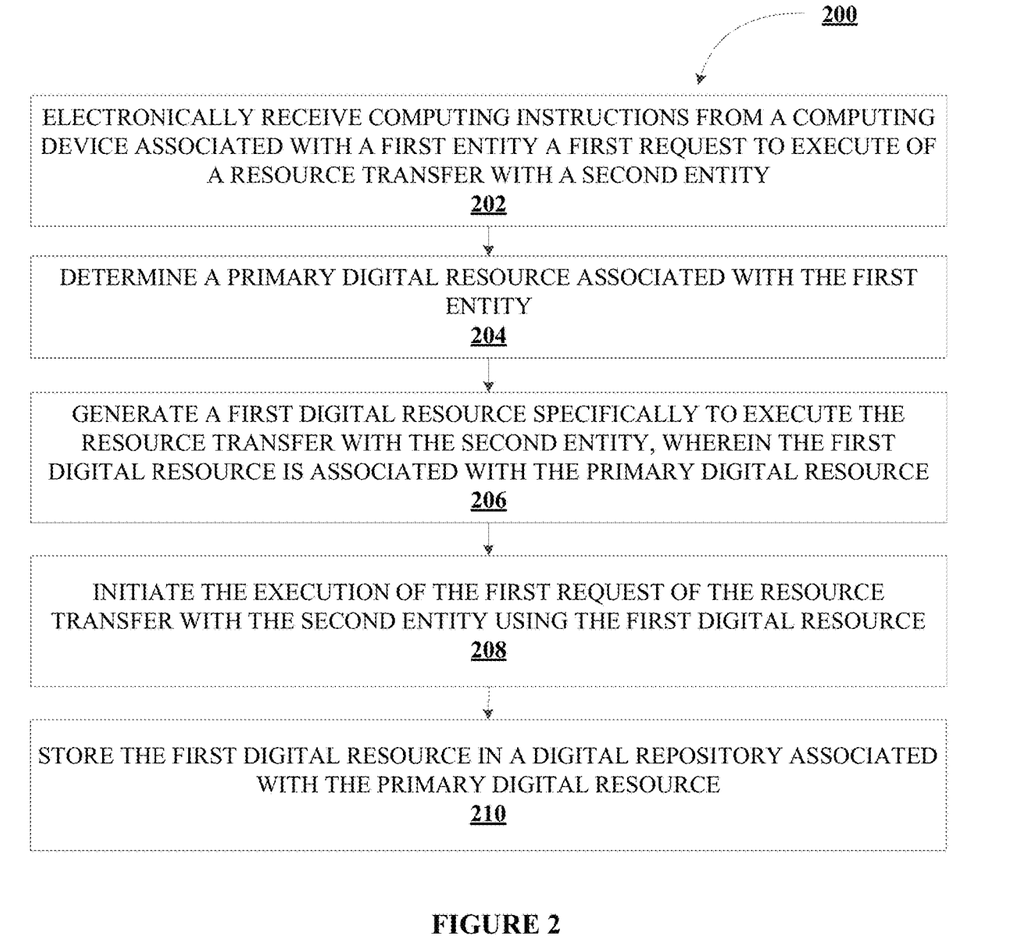
FIG. 2 illustrates a process flow for a layered digital resource distribution in an electronic network environment, in accordance with an embodiment of the invention.

FIG. 2 illustrates a process flow for a layered digital resource distribution in an electronic network environment 200, in accordance with an embodiment of the invention. As shown in block 202, the process flow includes electronically receiving computing instructions from a computing device associated with a first entity comprising a first request to execute a resource transfer with a second entity. In some embodiments, the first request may include at least information associated with the resource transfer. In one aspect, the information associated with the resource transfer may include information associated with one or more resources associated with the resource transfer, information associated with the second entity, information associated with the first entity, and a predetermined time period associated with the resource transfer. In some embodiments, the predetermined time period associated with the resource transfer may define set interval of time (e.g., periodic) at which the subsequent instances of resource transfer for same or similar resources will be executed. For example, if a user (first entity) wishes to purchase a monthly subscription (predetermined time period) to a periodical news magazine (second entity) for an amount of funds (resources), the first request will include information associated with the user, the news magazine, the amount of funds required to purchase the magazine each month, and information associated with the magazine.

Next, as shown in block 204, the process flow includes determining a primary digital resource associated with the first entity, wherein the primary digital resource is electronically linked to an electronic payment instrument associated with the first entity. As described herein, the payment instrument may be replaced with a primary digital resource and stored in a mobile wallet of the computing device associated the first entity. In some embodiments, the computing device associated with the first entity may be configured to store one or more primary digital resources with each primary digital resource replacing a payment instrument. And each of these primary digital resources may be associated with one or more secondary digital resources. In one aspect, at least one of the one or more primary digital resources may be assigned as the original digital resource, automatically selected to execute a resource transfer. In another aspect, the system may be configured to require the first entity to select at least one primary digital resource to execute a resource transfer.

Next, as shown in block 206, the process flow includes generating a first digital resource specifically to execute the resource transfer with the second entity, wherein the first digital resource is associated with the primary digital resource. In this regard, the first digital resource is specifically generated to execute the resource transfer with the second entity. In some embodiments, the first digital resource is electronically linked to the primary digital resource. In some embodiments, not every resource transfer executed using the primary digital resource will require generating a secondary digital resource. Some resource transfers may be executed using the primary digital resource. In some embodiments, the system may be configured to generate the first digital resources specifically to execute the resource transfer with the second entity if the first entity is known to execute many instances of the same resource transfer or many instances of different resource transfers with the second entity. In this regard, the system may be configured to determine that the first entity has executed a predetermined number of resource transfers with the second entity within a predetermined period of time. In response, the system may be configured to generate the first digital resource to use in the execution of any future instances of resource transfer with the second entity. In some other embodiments, the system may be configured to generate the first digital resource specifically to execute the resource transfer with the second entity regardless of how many times the first entity has previously executed resource transfers with the second entity.

Next, as shown in block 208, the process flow includes initiating the execution of the first request of the resource transfer with the second entity using the first digital resource.

Next, as shown in block 210, the process flow includes storing the first digital resource in a digital repository associated with the primary digital resource. In some embodiments, the digital repository may refer to an organized collection of digital resources, generally stored and accessed electronically via a computing device. Access to the digital repository is typically provided by initiating a database management engine configured to allow entities to interact with one or more database repositories and provides access to the contents stored therein.

In some embodiments, the system may be configured to electronically receive computing instructions from a computing device associated with the first entity comprising a second request to execute of a resource transfer with the second entity. In response to receiving the second request, the system may be configured to determine the primary digital resource associated with the first entity. In one aspect, the second request to execute the resource transfer with the second entity may be temporally subsequent to the first request to execute the resource transfer with the second entity. Thus, the first digital resource may have already been generated to execute resource transfers with the second entity. Once the primary digital resource is determined, the system may be configured to electronically retrieve from the digital repository associated with the primary digital resource, the first digital resource specifically generated to execute the resource transfer with the second entity. In response to retrieving the first digital resource, the system may be configured to initiate the execution of the second request of the resource transfer with the second entity using the first digital resource.

In some embodiments, the system may be configured to electronically receive computing instructions from the computing device associated with the first entity to retrieve one or more secondary digital resources associated with the primary digital resource. In response, the system may be configured to transmit control signals configured to cause the computing device associated with the first entity to display an authentication interface. In one aspect, the authentication interface may include one or more input fields configured to receive one or more authentication credentials from the first entity. In response, the system may be configured to electronically receive, via the authentication interface, the one or more authentication credentials from the first entity. In response to receiving the authentication credentials, the system may be configured to verify the one or more authentication credentials associated with the first entity. In response to verifying the authentication credentials, the system may be configured to transmit control signals configured to cause the computing device associated with the first entity to display the first user interface based on at least verifying the one or more authentication credentials. In one aspect, the first user interface comprises the one or more secondary digital resources associated with the master digital resource. In one aspect, the one or more secondary digital resources includes at least the first digital resource.

Figure 3:
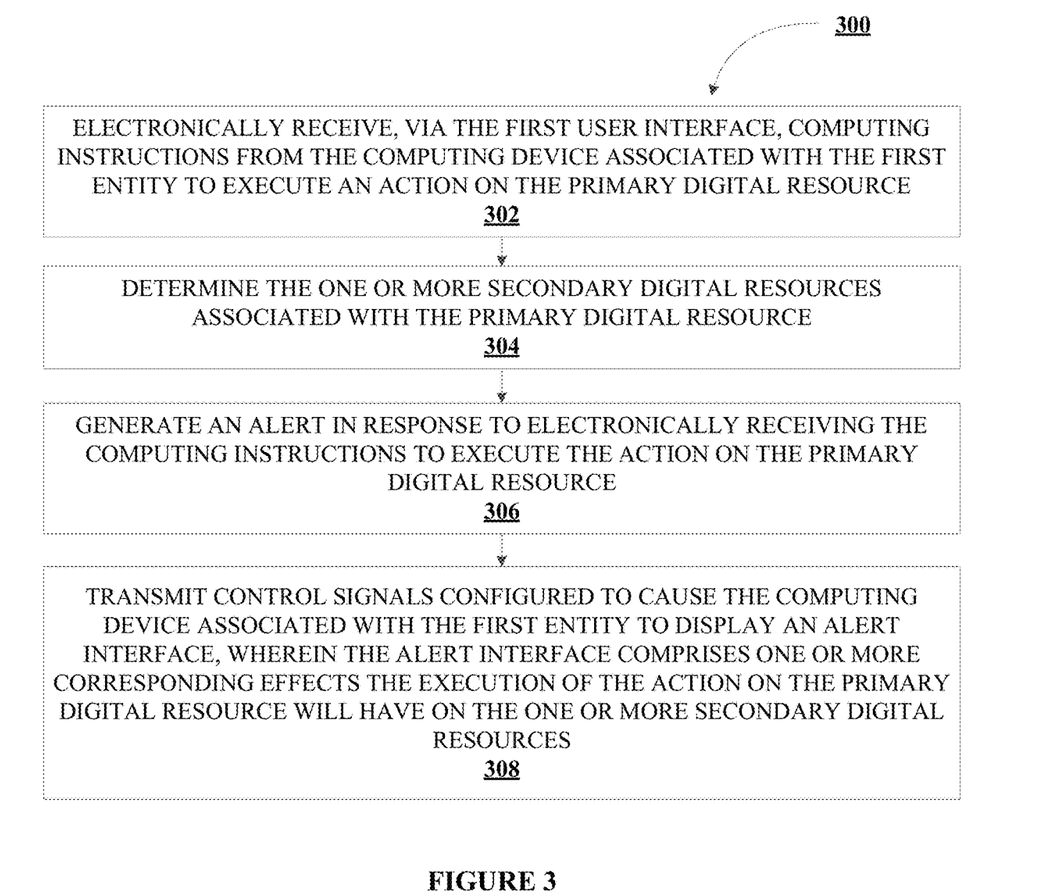
FIG. 3 illustrates a process flow for building a relationship hierarchy between digital resources in an electronic network environment, in accordance with an embodiment of the invention.

FIG. 3 illustrates a process flow for building a relationship hierarchy between digital resources in an electronic network environment 300, in accordance with an embodiment of the invention. As shown in block 302, the process flow includes electronically receiving, via the first user interface, computing instructions from the computing device associated with the first entity to execute an action the primary digital resource. In some embodiments, the action may be any operation executed on the primary digital resource that tends to affect the one or more secondary digital resources electronically linked to the primary digital resource. In this regard, the action may include one or more action types which includes, but is not limited to modifying, deleting, editing, replacing, and or any operation that is likely to affect the one or more secondary digital resources.

Next, as shown in block 304, the process flow includes determining the one or more secondary digital resources associated with the primary digital resource. Next, as shown in block 306, the process flow includes generating an alert in response to electronically receiving the computing instructions to execute the action on the primary digital resource. In some embodiments, the system may be configured to receive an indication from the computing device associated with the first entity, a type of action the first entity wishes to execute on the primary digital resource.

In some embodiments, the system may be configured to determine an effect the execution of the action on the primary digital resource will have on the one or more secondary digital resources electronically linked to the primary digital resource. In this regard, the system may be configured to determine one or more corresponding effects associated with each action executed on the primary digital resource. In one aspect, the action of modifying the primary digital resource may result in a corresponding effect of modification in at least one of the one or more secondary digital resources. In another aspect, the action of modifying the primary digital resource may result in the corresponding effect of deletion of at least one of the one or more secondary digital resources. In yet another aspect, the action of replacing the primary digital resource may result in a corresponding effect of a severed link between the primary digital resource and at least one of the one or more secondary digital resources.

Next, as shown in block 308, the process flow includes transmitting control signals configured to cause the computing device associated with the first entity to display an alert interface. In this regard, the alert interface may include one or more corresponding effects the execution of the action on the primary digital resource will have on the one or more secondary digital resources. In some embodiments, the system may be configured to initiate an alert generation engine to trigger an alert application to display the alert on the computing device associated with the first entity. In the alternative, the system may be configured to trigger a launch of a system-specific mobile application, such as financial institution mobile application or a merchant-specific mobile application and, subsequently display the alert on the computing device associated with the first entity.

In some embodiments, the system may be configured to electronically receive, via the alert interface, computing instructions from the computing device associated with the first entity to execute the action on the primary digital resource. As described herein, the action may be to delete the primary digital resource. In response to receiving instructions to delete the primary digital resource, the system may be configured to transform the one or more secondary digital resources into one or more primary digital resources. In one aspect, the system may be configured to transform the one or more secondary digital resources by severing a link between the primary digital resource and the one or more secondary resources. In addition to severing the link between the primary digital resource and the one or more secondary resources, the system may be configured to generate a link between the one or more secondary digital resources and the hardware security module associated with computing device of the first entity. In doing so, the system may be configured to generate a link between the one or more secondary digital resources and the electronic payment instrument stored in the mobile computing device. As described herein, in response to transforming the one or more secondary digital resources, the system may be configured to delete the primary digital resource. In response to deleting the primary digital resource, the system may be configured to replace the primary digital resource with the one or more transformed secondary digital resources. In this way, the present invention provides the functional benefit of ensuring a seamless transition between the digital resources even when the primary digital resource is removed while still being linked to one or more secondary digital resources.

In some embodiments, in response to receiving the computing instructions from the computing device associated with the first entity to delete the primary digital resource, the system may be configured to provide the user with a choice of "hard delete" or "soft delete." In some embodiments, hard delete may refer to a deletion procedure where the primary digital resource is completely removed from the computing device associated with the first entity. In some embodiments, soft delete may refer to a deletion procedure where the primary digital resource is marked as deleted, but is merely kept inactive for a predetermined period of time. During that predetermined period of time, the system may be configured to temporarily link the one or more secondary digital resources to the hardware security module of the computing device of the first entity. Once the predetermined period of time lapses, the system may be configured to sever the electronic link between the one or more secondary digital resources and the hardware security module of the computing device associated with the first entity, and re-establish the link between the primary digital resource and the hardware computing module of the computing device associated with the first entity.

In some embodiments, the system may be configured to electronically receive, via the first user interface, computing instructions from the computing device associated with the first entity to delete one or more secondary digital resources. In this regard, the system may be configured to receive a selection of at least one of the one or more secondary digital resources to be deleted. In response, the system may be configured to delete the at least one of the one or more secondary digital resources. Accordingly, the system may be configured to sever the link between the at least one of the one or more secondary digital resources and the primary digital resources and then delete the at least one of the one or more secondary digital resources from the computing device of the first entity. As described herein, the deletion may be a hard delete or a soft delete. While executing a hard delete removes the at least one of the one or more secondary digital resources permanently, a soft delete marks the at least one of the one or more secondary digital resources as deleted and is kept inactive for a predetermined period of time. In some other embodiments, the system may be configured to delete the primary digital resource and all the secondary digital resources electronically linked to the primary digital resource entirely. As described above, the deletion may be a hard delete or a soft delete.

Figure 4A:
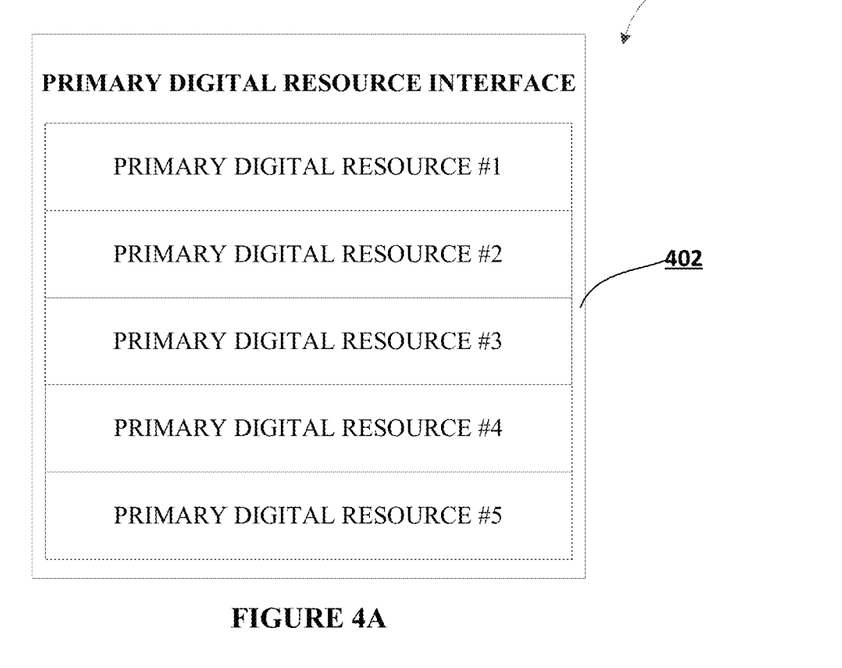
FIGS. 4A-4B illustrate exemplary digital resource interfaces, in accordance with an embodiment of the invention.
Figure 4B:
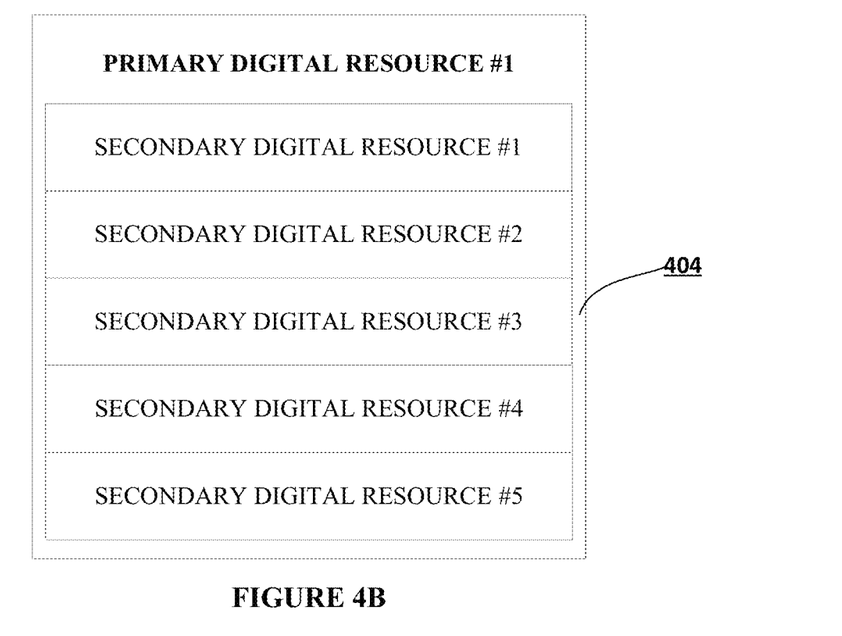

FIGS. 4A-4B illustrate exemplary digital resource interfaces 400, in accordance with an embodiment of the invention. As shown in FIG. 4A, the digital resource interface includes one or more primary digital resources associated with the first entity. As described herein, each primary digital resource may be associated with a payment instrument. Furthermore, each primary digital resource may be electronically linked to one or more secondary digital resources. As shown in FIG. 4B, the digital resource interface may include one or more secondary digital resources electronically linked to the primary digital resource #1. In some embodiments, the system may be configured to facilitate, via the digital resource interfaces 400, the first entity to manage the primary digital resources and the electronically linked secondary digital resources.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for layered digital resource distribution in an electronic network environment, the system comprising:
    at least one non-transitory storage device; and
    at least one processing device coupled to the at least one non-transitory storage device, wherein the at least one processing device is configured to:
    electronically receive computing instructions from a computing device associated with a first entity comprising a first request to execute a resource transfer with a second entity;
    determine a primary digital resource associated with the first entity, wherein the primary digital resource is electronically linked to an electronic payment instrument associated with the first entity, wherein the primary digital resource is linked to a hardware security module (HSM) associated with the computing device of the first entity;
    determine that a total number of past resource transfers executed by the first entity with the second entity is greater than a predetermined number of resource transfers;
    generate a first digital resource specifically to execute the resource transfer with the second entity based on at least determining that the total number of past resource transfers executed by the first entity with the second entity is greater than a predetermined number of resource transfers, wherein the first digital resource is specifically generated to execute the resource transfer with the second entity and any future resource transfers with the second entity, wherein the first digital resource is electronically linked to the primary digital resource;
    initiate the execution of the first request of the resource transfer with the second entity using the first digital resource;
    store the first digital resource in a digital repository associated with the primary digital resource;
    electronically receive, via an alert interface, computing instructions from the computing device associated with the first entity to execute a soft delete on the primary digital resource;
    execute the soft delete on the primary digital resource, wherein executing further comprises inactivating the primary digital resource for a predetermined period of time;
    sever the electronic link between the primary digital resource and the first digital resource in response to executing the soft delete on the primary digital resource;
    generate temporary electronic link between the first digital resource and the electronic payment instrument associated with the first entity;
    temporarily link the first digital resource in the HSM associated with the computing device of the first entity, wherein temporarily linking further comprises temporarily replacing the primary digital resource with the first digital resource;
    determine that the predetermined period of time has lapsed;
    sever the temporary electronic link between the first digital resource and the electronic payment instrument associated with the first entity based on at least determining that the predetermined period of time has lapsed;
    re-establish the link between the primary digital resource and the electronic payment instrument associated with the first entity; and
    re-link the primary digital resource in the HSM associated with the computing device of the first entity, wherein re-linking further comprises replacing the first digital resource with the primary digital resource.

2. The system of claim 1, wherein the at least one processing device is further configured to:
    electronically receive computing instructions from a computing device associated with the first entity comprising a second request to execute of a resource transfer with the second entity;
    determine the primary digital resource associated with the first entity;
    electronically retrieve from the digital repository associated with the primary digital resource, the first digital resource specifically generated to execute the resource transfer with the second entity; and initiate the execution of the second request of the resource transfer with the second entity using the first digital resource.

3. The system of claim 1, wherein the at least one processing device is further configured to:
electronically receive computing instructions from the computing device associated with the first entity to retrieve one or more secondary digital resources associated with the primary digital resource; and
transmit control signals configured to cause the computing device associated with the first entity to display a first user interface, wherein the first user interface comprises the one or more secondary digital resources associated with the primary digital resource, wherein the one or more secondary digital resources comprises at least the first digital resource.

4. The system of claim 3, wherein the at least one processing device is further configured to:
transmit control signals configured to cause the computing device associated with the first entity to display an authentication interface, wherein the authentication interface comprises one or more input fields configured to receive one or more authentication credentials from the first entity;
electronically receive, via the authentication interface, the one or more authentication credentials from the first entity;
verify the one or more authentication credentials associated with the first entity; and
transmit control signals configured to cause the computing device associated with the first entity to display the first user interface based on at least verifying the one or more authentication credentials.

5. The system of claim 4, wherein the at least one processing device is further configured to:
electronically receive, via the first user interface, computing instructions from the computing device associated with the first entity to execute an action on the primary digital resource, wherein the action comprises at least deleting the primary digital resource, modifying the primary digital resource, and/or replacing the primary digital resource;
determine the one or more secondary digital resources associated with the primary digital resource;
generate an alert in response to electronically receiving the computing instructions to execute the action the primary digital resource; and
transmit control signals configured to cause the computing device associated with the first entity to display the alert interface, wherein the alert interface comprises one or more corresponding effects the execution of the action on the primary digital resource will have on the one or more secondary digital resources.

6. The system of claim 5, wherein the at least one processing device is further configured to:
electronically receive, via the alert interface, computing instructions from the computing device associated with the first entity to delete the primary digital resource;
transform the one or more secondary digital resources into one or more primary digital resources;
delete the primary digital resource; and
replace the primary digital resource with the one or more transformed secondary digital resources.

7. The system of claim 6, wherein the at least one processing device is further configured to transform the one or more secondary digital resources into the one or more primary digital resources, wherein transforming further comprises:
severing a link between the primary digital resource and the one or more secondary resources; and
generating a link between the one or more secondary digital resources and the electronic payment instrument associated with the first entity.

8. A computer-implemented method for layered digital resource distribution in an electronic network environment, the method comprising:
electronically receiving computing instructions from a computing device associated with a first entity comprising a first request to execute a resource transfer with a second entity;
determining a primary digital resource associated with the first entity, wherein the primary digital resource is electronically linked to an electronic payment instrument associated with the first entity, wherein the primary digital resource is linked to a hardware security module (HSM) associated with the computing device of the first entity;
determining that a total number of past resource transfers executed by the first entity with the second entity is greater than a predetermined number of resource transfers;
generating a first digital resource specifically to execute the resource transfer with the second entity based on at least determining that the total number of past resource transfers executed by the first entity with the second entity is greater than a predetermined number of resource transfers, wherein the first digital resource is specifically generated to execute the resource transfer with the second entity and any future resource transfers with the second entity, wherein the first digital resource is electronically linked to the primary digital resource;
initiating the execution of the first request of the resource transfer with the second entity using the first digital resource;
storing the first digital resource in a digital repository associated with the primary digital resource;
electronically receiving, via an alert interface, computing instructions from the computing device associated with the first entity to execute a soft delete on the primary digital resource;
executing the soft delete on the primary digital resource, wherein executing further comprises inactivating the primary digital resource for a predetermined period of time;
severing the electronic link between the primary digital resource and the first digital resource in response to executing the soft delete on the primary digital resource;
generating temporary electronic link between the first digital resource and the electronic payment instrument associated with the first entity;
temporarily linking the first digital resource in the HSM associated with the computing device of the first entity, wherein temporarily linking further comprises temporarily replacing the primary digital resource with the first digital resource;
determining that the predetermined period of time has lapsed;
severing the temporary electronic link between the first digital resource and the electronic payment instrument associated with the first entity based on at least determining that the predetermined period of time has lapsed;

re-establishing the link between the primary digital resource and the electronic payment instrument associated with the first entity; and re-linking the primary digital resource in the HSM associated with the computing device of the first entity, wherein re-linking further comprises replacing the first digital resource with the primary digital resource.

9. The computer-implemented method of claim 8, wherein the method further comprises:

electronically receiving computing instructions from a computing device associated with the first entity comprising a second request to execute of a resource transfer with the second entity;

determining the primary digital resource associated with the first entity;

electronically retrieving from the digital repository associated with the primary digital resource, the first digital resource specifically generated to execute the resource transfer with the second entity; and initiating the execution of the second request of the resource transfer with the second entity using the first digital resource.

10. The computer-implemented method of claim 8, wherein the method further comprises:

electronically receiving computing instructions from the computing device associated with the first entity to retrieve one or more secondary digital resources associated with the primary digital resource; and transmitting control signals configured to cause the computing device associated with the first entity to display a first user interface, wherein the first user interface comprises the one or more secondary digital resources associated with the primary digital resource, wherein the one or more secondary digital resources comprises at least the first digital resource.

11. The computer-implemented method of claim 10, wherein the method further comprises:

transmitting control signals configured to cause the computing device associated with the first entity to display an authentication interface, wherein the authentication interface comprises one or more input fields configured to receive one or more authentication credentials from the first entity;

electronically receiving, via the authentication interface, the one or more authentication credentials from the first entity;

verifying the one or more authentication credentials associated with the first entity; and transmitting control signals configured to cause the computing device associated with the first entity to display the first user interface based on at least verifying the one or more authentication credentials.

12. The computer-implemented method of claim 11, wherein the method further comprises:

electronically receiving, via the first user interface, computing instructions from the computing device associated with the first entity to execute an action on the primary digital resource, wherein the action comprises at least deleting the primary digital resource, modifying the primary digital resource, and/or replacing the primary digital resource;

determining the one or more secondary digital resources associated with the primary digital resource;

generating an alert in response to electronically receiving the computing instructions to execute the action the primary digital resource; and transmitting control signals configured to cause the computing device associated with the first entity to display the alert interface, wherein the alert interface comprises one or more corresponding effects the execution of the action on the primary digital resource will have on the one or more secondary digital resources.

13. The computer-implemented method of claim 12, wherein the method further comprises:

electronically receiving, via the alert interface, computing instructions from the computing device associated with the first entity to delete the primary digital resource;

transforming the one or more secondary digital resources into one or more primary digital resources;

deleting the primary digital resource; and replacing the primary digital resource with the one or more transformed secondary digital resources.

14. The computer-implemented method of claim 13, wherein the method further comprises transforming the one or more secondary digital resources into the one or more primary digital resources, wherein transforming further comprises:

severing a link between the primary digital resource and the one or more secondary resources; and generating a link between the one or more secondary digital resources and the electronic payment instrument associated with the first entity.

15. A computer program product for layered digital resource distribution in an electronic network environment, the computer program product comprising a non-transitory computer-readable medium comprising code causing a first apparatus to:

electronically receive computing instructions from a computing device associated with a first entity comprising a first request to execute a resource transfer with a second entity;

determine a primary digital resource associated with the first entity, wherein the primary digital resource is electronically linked to an electronic payment instrument associated with the first entity, wherein the primary digital resource is linked to a hardware security module (HSM) associated with the computing device of the first entity;

determine that a total number of past resource transfers executed by the first entity with the second entity is greater than a predetermined number of resource transfers;

generate a first digital resource specifically to execute the resource transfer with the second entity based on at least determining that the total number of past resource transfers executed by the first entity with the second entity is greater than a predetermined number of resource transfers, wherein the first digital resource is specifically generated to execute the resource transfer with the second entity and any future resource transfers with the second entity, wherein the first digital resource is electronically linked to the primary digital resource;

initiate the execution of the first request of the resource transfer with the second entity using the first digital resource;

store the first digital resource in a digital repository associated with the primary digital resource;

electronically receive, via an alert interface, computing instructions from the computing device associated with the first entity to execute a soft delete on the primary digital resource;

execute the soft delete on the primary digital resource, wherein executing further comprises inactivating the primary digital resource for a predetermined period of time;

sever the electronic link between the primary digital resource and the first digital resource in response to executing the soft delete on the primary digital resource;

generate temporary electronic link between the first digital resource and the electronic payment instrument associated with the first entity;

temporarily link the first digital resource in the HSM associated with the computing device of the first entity, wherein temporarily linking further comprises temporarily replacing the primary digital resource with the first digital resource;

determine that the predetermined period of time has lapsed;

sever the temporary electronic link between the first digital resource and the electronic payment instrument associated with the first entity based on at least determining that the predetermined period of time has lapsed;

re-establish the link between the primary digital resource and the electronic payment instrument associated with the first entity; and re-link the primary digital resource in the HSM associated with the computing device of the first entity, wherein re-linking further comprises replacing the first digital resource with the primary digital resource.

16. The computer program product of claim 15, wherein the first apparatus is further configured to:

electronically receive computing instructions from a computing device associated with the first entity comprising a second request to execute of a resource transfer with the second entity;

determine the primary digital resource associated with the first entity;

electronically retrieve from the digital repository associated with the primary digital resource, the first digital resource specifically generated to execute the resource transfer with the second entity; and initiate the execution of the second request of the resource transfer with the second entity using the first digital resource.

17. The computer program product of claim 15, wherein the first apparatus is further configured to:

electronically receive computing instructions from the computing device associated with the first entity to retrieve one or more secondary digital resources associated with the primary digital resource; and transmit control signals configured to cause the computing device associated with the first entity to display a first user interface, wherein the first user interface comprises the one or more secondary digital resources associated with the primary digital resource, wherein the one or more secondary digital resources comprises at least the first digital resource.

18. The computer program product of claim 17, wherein the first apparatus is further configured to:

transmit control signals configured to cause the computing device associated with the first entity to display an authentication interface, wherein the authentication interface comprises one or more input fields configured to receive one or more authentication credentials from the first entity;

electronically receive, via the authentication interface, the one or more authentication credentials from the first entity;

verify the one or more authentication credentials associated with the first entity; and transmit control signals configured to cause the computing device associated with the first entity to display the first user interface based on at least verifying the one or more authentication credentials.

19. The computer program product of claim 18, wherein the first apparatus is further configured to:

electronically receive, via the first user interface, computing instructions from the computing device associated with the first entity to execute an action on the primary digital resource, wherein the action comprises at least deleting the primary digital resource, modifying the primary digital resource, and/or replacing the primary digital resource;

determine the one or more secondary digital resources associated with the primary digital resource;

generate an alert in response to electronically receiving the computing instructions to execute the action the primary digital resource; and transmit control signals configured to cause the computing device associated with the first entity to display the alert interface, wherein the alert interface comprises one or more corresponding effects the execution of the action on the primary digital resource will have on the one or more secondary digital resources.

20. The computer program product of claim 19, wherein the first apparatus is further configured to:

electronically receive, via the alert interface, computing instructions from the computing device associated with the first entity to delete the primary digital resource;

transform the one or more secondary digital resources into one or more primary digital resources;

delete the primary digital resource; and replace the primary digital resource with the one or more transformed secondary digital resources.

* * * * *